United States Patent
Fan et al.

(10) Patent No.: US 6,839,152 B2
(45) Date of Patent: Jan. 4, 2005

(54) ADAPTIVE FILTERING METHOD AND APPARATUS FOR DESCREENING SCANNED HALFTONED IMAGE REPRESENTATIONS

(75) Inventors: Zhigang Fan, Webster, NY (US); Ying-Wei Lin, Penfield, NY (US); Hong Li, Broomfield, CO (US)

(73) Assignee: Xerox Corporation, Stamford, CT (US)

( * ) Notice: Subject to any disclaimer, the term of this patent is extended or adjusted under 35 U.S.C. 154(b) by 928 days.

(21) Appl. No.: 09/731,131

(22) Filed: Dec. 6, 2000

(65) Prior Publication Data

US 2002/0093686 A1 Jul. 18, 2002

(51) Int. Cl.[7] .............................................. G06K 15/00
(52) U.S. Cl. ..................... 358/3.08; 382/260; 382/264; 382/274
(58) Field of Search ................................. 382/210, 260, 382/264, 272, 274; 358/3.08, 3.1, 530, 536

(56) References Cited

U.S. PATENT DOCUMENTS

| | | | |
|---|---|---|---|
| 4,877,310 A | * 10/1989 | Seachman et al. | 349/193 |
| 5,027,078 A | 6/1991 | Fan | 358/456 |
| 5,166,810 A | 11/1992 | Sorimachi et al. | |
| 5,239,390 A | 8/1993 | Tai | |
| 5,243,444 A | 9/1993 | Fan | 358/456 |
| 5,339,170 A | 8/1994 | Fan | 358/456 |
| 5,457,754 A | * 10/1995 | Han et al. | 382/128 |
| 5,799,112 A | 8/1998 | de Queiroz et al. | 382/254 |
| 6,101,285 A | 8/2000 | Fan | 382/254 |
| 6,233,060 B1 | 5/2001 | Shu et al. | |
| 6,603,877 B1 | * 8/2003 | Bishop | 382/165 |

FOREIGN PATENT DOCUMENTS

| | | |
|---|---|---|
| EP | 0 622 949 A1 | 11/1994 |
| EP | 0 827 333 A2 | 3/1998 |
| JP | 2000-101845 | 4/2000 |

OTHER PUBLICATIONS

M. Analoui et al., *New Results on Reconstruction of Continuous–Tone from Halftone*, 1992 IEEE, pp. III–313 through III–316.

(List continued on next page.)

Primary Examiner—Jerome Grant, II
(74) Attorney, Agent, or Firm—Fay, Sharpe, Fagan, Minnich & McKee, LLP

(57) ABSTRACT

An adaptive filtering method and apparatus for descreening a scanned halftoned image representation is disclosed. The apparatus includes an image input subsystem; a processing subsystem for processing halftoned image data provided by the image input subsystem; and software/firmware means operative on the processing subsystem for a) low-pass filtering a halftoned input pixel value provided by the image input subsystem to produce a low-pass filtered pixel value; b) notch-filtering the halftoned input pixel value to produce a notch-filtered pixel value; c) determining a local contrast value for the halftoned input pixel value; and d) producing a descreened output pixel value based on the low-pass filtered pixel value, the notch-filtered pixel value, or a combination of the low-pass filtered pixel value and the notch-filtered pixel value depending on the local contrast value.

21 Claims, 3 Drawing Sheets

OTHER PUBLICATIONS

Z. Fan, *Retrieval of Gray Images from Digital Halftones,* 1992 IEEE, pp. 2477 through 2480.

R. Stevenson, *Inverse Halftoning via MAP Estimation,* IEEE Transactions on Image Processing, vol. 6, No. 4, Apr., 1997, pp. 574 through 583.

Y. Kim et al., *Inverse Halftoning Using Binary Permutation Filters,* IEEE Transactions on Image Processing, vol. 4, No. 9, Sep., 1995, pp. 1296 through 1311.

J. Lai et al., *Inverse Error–Diffusion Using Classified Vector Quantization,* IEEE Transactions on Image Processing, vol. 7, No. 12, Dec., 1998, pp. 1753 through 1758.

P. Wong, *Inverse Halftoning and Kernel Estimation for Error Diffusion,* IEEE Transaction on Image Processing, vol. 4, No. 4, Apr., 1995, pp. 486 through 498.

S. Hein et al., *Halftone to Continuous–Tone Conversion of Error–Diffusion Coded Images,* IEEE Transactions on Image Processing, vol. 4, No. 2, Feb., 1995, pp. 208 through 216.

Reinhard Klette and Piero Zamperoni, "handbook of image processing operators" 1996, John Wiley & Sons, Chichester, England XP002253053, pp. 208–210.

\* cited by examiner

ADAPTIVE FILTERING METHOD AND APPARATUS FOR DESCREENING SCANNED HALFTONED IMAGE REPRESENTATIONS

BACKGROUND OF THE INVENTION

The present invention relates generally to converting a halftoned image representation, generated from an original continuous toned or contoned image representation, back into a contoned image representation, and more particularly to an adaptive filtering method and apparatus for descreening a scanned halftoned image representation, and will be described with particular reference thereto.

Document Processing Systems (DPS) refers to a set of devices that construct, produce, print, translate, store and archive documents and their constituent elements. Such devices include printers, copiers, scanners, fax machines, electronic libraries, and the like. The present invention addresses situations particularly relevant to printing systems and discusses them as the prime example of a DPS, but the present invention should not be construed to be limited to any such particular printing application. Any DPS is intended to benefit from the advantages of this invention.

Hardcopy images obtained by silver halide photography or standard lithographic processes are typically provided in continuous tone or contone form. Continuous tone images are converted to halftone or binary images to enable the production of certain types of printed copies such as found in newspapers and magazines. Halftone images are binary images having pixels that are either turned on or off. Halftone images are generated from contone images using a variety of known halftoning techniques including i) threshold arrays or dithering, such as clustered dots, dispersed dots, and stochastic screens; ii) adaptive processes, such as error diffusion; and iii) interactive processes, such as least squares and direct binary search.

A halftoned image is printed by enabling or withholding the application of ink at locations on the copy sheet that correspond to the output of each pixel. Unfortunately, direct printing of a halftone image that has been acquired by scanning or similar methods is usually not desired. moiré, distortions, and other artifacts are often introduced when image processing operations such as scaling, enhancement, color correction, re-halftoning at a different screen frequency, etc., are performed on scanned halftone images.

Because of this, scanned halftone images are usually converted to a continuous tone image, subjected to appropriate image processing, and then reconverted back to a halftone image for printing. Thus, image processing systems used with printers in reprographic systems typically require the capability to convert scanned halftone images to continuous tone images to meet these conversion and reconversion needs, and to enable processing by any of a large variety of enhancement algorithms commonly available for continuous tone images.

Unscreening or descreening refers to reversing the digital halftone process in order to approximate a continuous tone digital image. The goal of descreening is to generate a descreened contone image which most closely approximates the original contone image from which the original halftone image was itself created. A conventional method of reversing the halftoning process is through the application of a low-pass filter to the halftone image data. Generally speaking, low-pass filtering methods cannot maintain the fidelity (i.e. fine detail) of the edge information contained in the original image, and in fact, may blur edges and lose fine details in the descreened continuous tone output image. In addition, low-pass filtering methods can introduce artifacts into the descreened continuous tone output image. Another method of reversing the halftoning process is through the application of a notch filter to the halftone image data. Notch filtering methods preserve the sharpness of edges in the descreened continuous tone output image, but also introduce periodic structures due to remaining high order harmonics.

Accordingly, it is considered desirable to develop a new and improved adaptive filtering method and apparatus for descreening a scanned halftoned image representation, that meets the above-stated needs and overcomes the foregoing difficulties and others while providing better and more advantageous results.

SUMMARY OF THE INVENTION

More particularly, the present invention provides a new and improved adaptive filtering method and apparatus for descreening a scanned halftoned image representation. The present invention uses a linear combination of the results of low-pass filtering and notch filtering. The weight of the linear combination is determined by the contrast of the low-pass filtered image in a small neighborhood. The present invention takes advantage of the smoothness of the low-pass filtered image in slowly varying regions while preserving sharpness of edges in the notch filtered image. Thus, the present invention shows improved results over low-pass filtering and notch filtering, and does not result in artifacts of other adaptive methods. When a halftone image that has been descreened according to the present invention is rescreened with a similar frequency halftone dot, the descreened halftone image has no moiré, while providing more details and sharper edges.

In accordance with one aspect of the present invention, a method for descreening halftoned image data is disclosed. The method includes a) low-pass filtering a halftoned input pixel value to produce a low-pass filtered pixel value; b) notch-filtering the halftoned input pixel value to produce a notch-filtered pixel value; c) determining a local contrast value for the halftoned input pixel value; and d) producing a descreened output pixel value based on the low-pass filtered pixel value, the notch-filtered pixel value, or a combination of the low-pass filtered pixel value and the notch-filtered pixel value depending on the local contrast value.

In accordance with another aspect of the present invention, a document processing system for converting halftoned image data into continuous toned image data is disclosed. The system includes an image input subsystem; a processing subsystem for processing halftoned image data provided by the image input subsystem; and software/firmware means operative on the processing subsystem for a) low-pass filtering a halftoned input pixel value provided by the image input subsystem to produce a low-pass filtered pixel value; b) notch-filtering the halftoned input pixel value to produce a notch-filtered pixel value; c) determining a local contrast value for the halftoned input pixel value; and d) producing a descreened output pixel value based on the low-pass filtered pixel value, the notch-filtered pixel value, or a combination of the low-pass filtered pixel value and the notch-filtered pixel value depending on the local contrast value.

An advantage of the present invention is the provision of an adaptive method and apparatus for descreening a scanned halftoned image representation that overcomes the disadvantages associated with separately low-pass filtering or notch filtering the scanned halftone image representation.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENT

Figure 1:
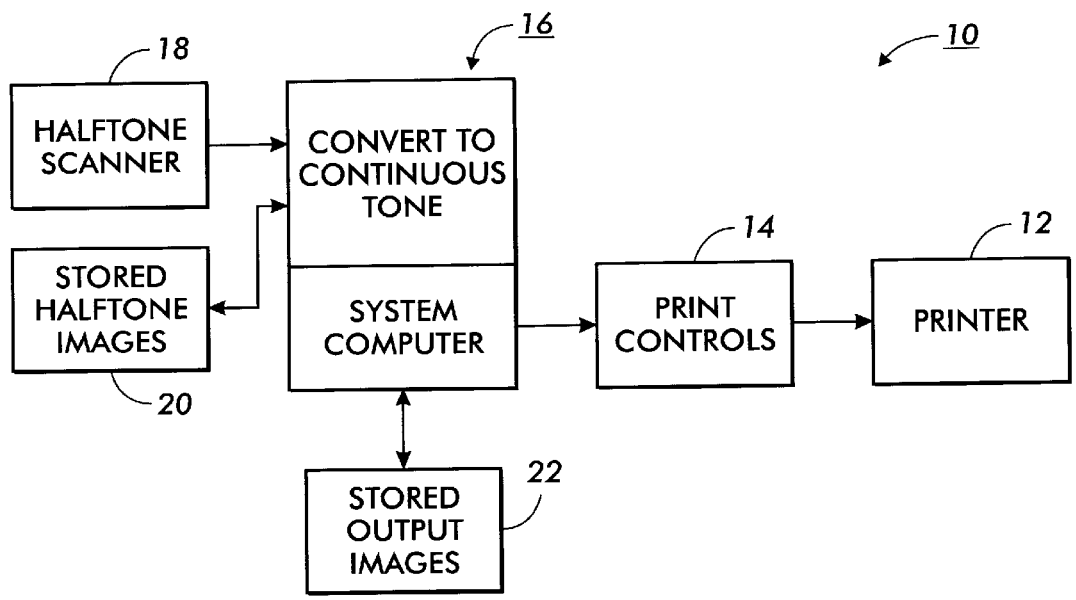
FIG. 1 is a simplified block diagram of an exemplary document processing system (DPS) which incorporates the present invention.

With reference now to FIG. 1, an exemplary document processing system (DPS) 10, such as a reprographic, xerographic, inkjet, etc. system, includes a conventional printer or printing subsystem 12 that is operated by printer controls 14 under the control of an image processing subsystem or system computer 16. Input halftone images are obtained from an image input subsystem such as conventional scanner or scanning subsystem 18 or a first memory 20 that stores scanned halftone images. A second memory 22 can be used to store descreened halftone images such as for subsequent processing and/or output at printer 12.

A scanned halftone image obtained from scanner 18 or first memory 20 is first unscreened or descreened by an adaptive filtering routine executed by the image processor 16. Thereafter, a conventional, downstream image processing step (i.e. scaling, enhancement, color correction, re-halftoning at a different screen frequency, etc.) can be executed on the descreened contone image data, before the descreened contone image data is reconverted to a halftone image for print processing at printer 12, or for temporary storage in memory 22.

Figure 2:
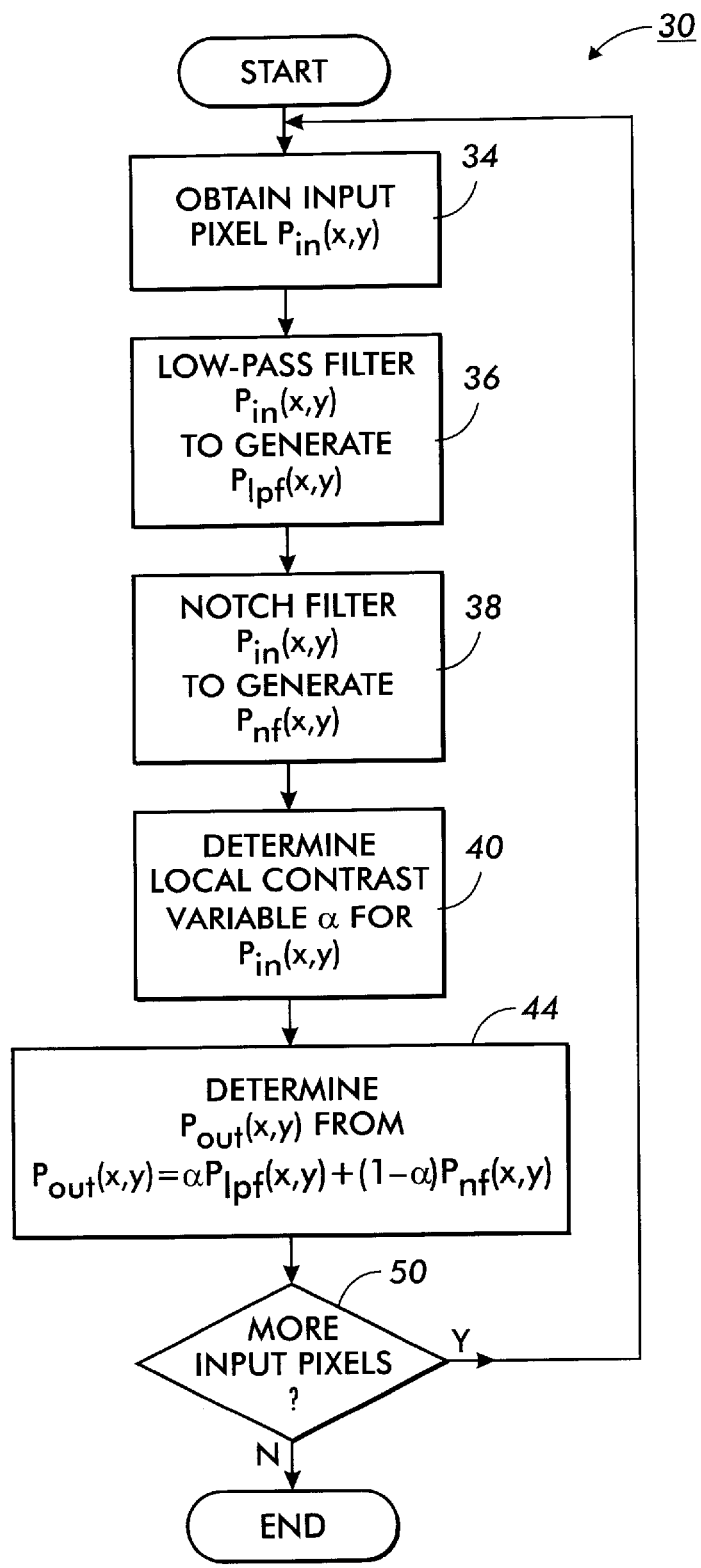
FIG. 2 is an operational flowchart for descreening a scanned halftoned image representation in accordance with the present invention.
Figure 3:
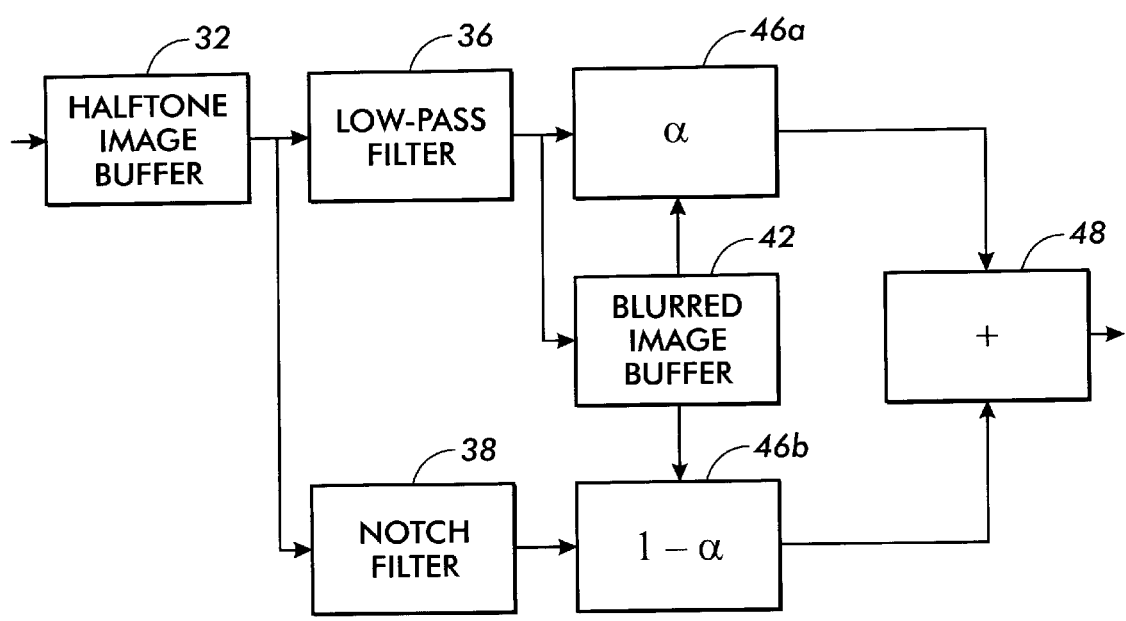
FIG. 3 is a simplified block diagram of an exemplary image processor associated with the DPS of FIG. 1 for executing the routine of FIG. 2.

Referring now to FIGS. 2 and 3, a scanned halftone image is descreened on a pixel-by-pixel basis by the adaptive filtering routine 30 executed in the processor 16. The adaptive filtering routine 30 begins by inputting a pixel $P_{in}(x,y)$ from a halftone image buffer 32 (step 34) that temporarily stores or otherwise holds one or more raster lines of halftone image data representing the halftone image to be descreened. The input pixel value $P_{in}(x,y)$ is low-pass filtered in a conventional manner to generate a low-pass filtered pixel value $P_{lpf}(x,y)$ (step/filter 36). In addition, the input pixel value $P_{in}(x,y)$ is separately notch filtered in a conventional manner to generate a notch-filtered pixel value $P_{nf}(x,y)$ (step/filter 38). Thereafter, a local contrast variable a is then determined for the input pixel $P_{in}(x,y)$ (step 40). The local contrast variable $\alpha$ has a value in the range of $0 \leq \alpha \leq 1$ depending upon the local contrast within a neighborhood of the input pixel $P_{in}(x,y)$.

In particular, the local contrast variable $\alpha$ is determined by first blurring the original scanned halftone image data using a low-pass filter such as filter 36, and storing the blurred halftone image data in a blurred image buffer 42. It is contemplated that the buffer 42 can store the full blurred (i.e. low-pass filtered) halftone image, or can store only that amount of blurred image data that is necessary for determining the local contrast variable $\alpha$ for the input pixel $P_{in}(x,y)$.

Thereafter, a local variance of pixel values within a 2D window (e.g. 3×3) centered on a blurred image pixel $P_{blur}(x,y)$ corresponding to the input pixel $P_{in}(x,y)$ is analyzed. The local pixel variance is analyzed by determining the difference (d) between the maximum pixel value $P_{max}(x,y)$ and the minimum pixel value $P_{min}(x,y)$ within the 2D window. The local contrast variable $\alpha$ is a function of the difference (d), and can be determined from the following pseudo code:

IF $d \leq A$ THEN $\alpha = 1$ OR IF $A < d < B$ THEN $\alpha = (B-d)/(B-A)$, where $1 > \alpha > 0$ OR IF $d \geq B$ THEN $\alpha = 0$, where (d) is the difference between the maximum pixel value $P_{max}(x,y)$ and the minimum pixel value $P_{min}(x,y)$ within the 2D window that is centered on the blurred image pixel $P_{blur}(x,y)$, and (A) and (B) are empirically-determined constants. In the embodiment being described, A=8 and B=32.

Thereafter, a descreened output pixel value $P_{out}(x,y)$ is determined from the equation:

$$P_{out}(x,y)=\alpha P_{lpf}(x,y)+(1-\alpha)P_{nf}(X,Y) \qquad \text{Eq.1}$$

where $\alpha$ is the local contrast variable, $P_{lpf}(x,y)$ is the low-pass filtered pixel value, and $P_{nf}(x,y)$ is the notch-filtered pixel value (step 44 or multiplier/adder circuits 46a, 46b, 48).

Thus, when the local contrast value $\alpha$ within the neighborhood surrounding the input pixel $P_{in}(x,y)$, is relatively low (i.e. less than or equal to about 8), then the descreened output pixel value $P_{out}(x,y)$ is equal to the low-pass filtered pixel value $P_{lpf}(x,y)$. Likewise, when the local contrast value a within the neighborhood surrounding the input pixel $P_{in}(x,y)$, is relatively high (i.e. greater than or equal to about 32), then the descreened output pixel value $P_{out}(x,y)$ is equal to the notch-filtered pixel value $P_{nf}(x,y)$. Further, when the local contrast value a within the neighborhood surrounding the input pixel $P_{in}(x,y)$, is moderate (i.e. greater than about 8 and less than about 32), then the descreened output pixel value $P_{out}(x,y)$ is a linear combination of the low-pass filtered pixel value $P_{lpf}(x,y)$ and the notch-filtered pixel value $P_{nf}(x,y)$.

If the full scanned halftone image has not been descreened, the adaptive filtering routine 30 returns to step 34 to process the next input pixel, otherwise the routine ends (step 50). It should be appreciated that one or more downstream image processing operations such as scaling, enhancement, color correction, re-halftoning or rescreening at the same or a different screen frequency, etc. can be performed directly on the descreened output pixel value $P_{out}(x,y)$ prior to processing the next input pixel. However, in the case where a plurality of descreened output pixel values are necessary to perform an image processing operation (i.e. an area image processing operation), the descreened output pixel value $P_{out}(x,y)$ can be stored in a descreened image buffer such as memory 22 until the required number of pixels have been processed. After any downstream image processing operation(s) are complete, the descreened and/or image processed output pixel value(s) can be rendered by the printer 12.

In the embodiment being described, the low-pass filter/filtering step 36 and the notch filter/filtering step 38 are both implemented in the spatial domain using convolution. More particularly, the low-pass filter/filtering step 36 and the notch filter/filtering step 38 are 2D separable filters with 29 elements in each direction. It should be appreciated that where the scanned image size is relatively large and the filter size is relatively small, it is more economical to filter in the spatial domain than in the frequency domain. However, it is contemplated that the low-pass filter/filtering step 36 and/or the notch filter/filtering step 38 can be implemented by transforming and filtering in the frequency domain via FFTs.

It should also be appreciated that the notch filter/filtering step 38 can be implemented directly, or as a bandpass filter where, using shorthand notation, the notch filter=1-bandpass filter. Thus, a bandpass filter/filtering step is used to filter the scanned halftone image, and then the filtered image is subtracted from the original image. This can be performed on a pixel-by-pixel basis, or for the image as a whole. Thus, the notch filter/filtering step 38 can be implemented through a bandpass filter/filtering step, or directly. In either case, the notch filter coefficients or bandpass filter coefficients, can be determined using a digital filter design package such as MATLAB®, a well-known data and signal processing software package that is available from The MathWorks, Inc. of Natick, Mass.

The invention has been described with reference to the preferred embodiment (s). Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A method for descreening halftoned image data comprising:
   a) low-pass filtering a halftoned input pixel value to produce a low-pass filtered pixel value;
   b) notch-filtering the halftoned input pixel value to produce a notch-filtered pixel value;
   c) determining a local contrast value for the halftoned input pixel value; and
   d) producing a descreened output pixel value based on the low-pass filtered pixel value, the notch-filtered pixel value, or a combination of the low-pass filtered pixel value and the notch-filtered pixel value depending on the local contrast value.

2. The method of claim 1, wherein step c) includes:
   e) generating blurred image data from the halftoned image data;
   f) determining a difference between a maximum pixel value and a minimum pixel value within a window centered on a blurred image data pixel corresponding to the halftoned input pixel; and
   g) determining the local contrast value based on the difference between the maximum pixel value and the minimum pixel value.

3. The method of claim 2, wherein the local contrast value is determined from:

IF $d \leq A$, THEN $\alpha=1$

OR IF $A<d<B$, THEN $\alpha=(B-d)/(B-A)$

OR IF $d \geq B$, THEN $\alpha=0$ where ($\alpha$) is the local contrast value, (d) is the difference between the maximum pixel value and the minimum pixel value, and (A) and (B) are constants.

4. The method of claim 3, wherein (A) is about 8 and (B) is about 32.

5. The method of claim 1, wherein step d) includes:
   e) producing the descreened output pixel value based on the low-pass filtered pixel value when the local contrast value is less than or equal to a first threshold value;
   f) producing the descreened output pixel value based on the notch-filtered pixel value when the local contrast value is greater than or equal to a second threshold value; and
   g) producing the descreened output pixel value based on the combination of the low-pass filtered pixel value and the notch-filtered pixel value when the local contrast value is greater than the first threshold value and less than the second threshold value.

6. The method of claim 5, wherein the first threshold value is about 8 and the second threshold value is about 32.

7. The method of claim 1, wherein the descreened output pixel value is determined from:

$$P_{out}(x,y)=\alpha P_{lpf}(x,y)+(1-\alpha)P_{nf}(x,y)$$

where $P_{out}(x,y)$ is the descreened output pixel value, ($\alpha$) is the local contrast variable, $P_{lpf}(x,y)$ is the low-pass filtered pixel value, and $P_{nf}(x,y)$ is the notch-filtered pixel value.

8. The method of claim 7, wherein the local contrast variable is in the range of 0 to 1.

9. The method of claim 7, wherein the local contrast variable is determined by:
   e) generating blurred image data from the halftoned image data;
   f) determining a difference between a maximum pixel value and a minimum pixel value within a window centered on a blurred image data pixel corresponding to the halftoned input pixel; and
   g) determining the local contrast value based on the difference between the maximum pixel value and the minimum pixel value.

10. The method of claim 7, wherein the local contrast value is determined from:

IF $d \leq A$, THEN $\alpha=1$

OR IF $A<d<B$, THEN $\alpha=(B-d)/(B-A)$

OR IF $d \geq B$, THEN $\alpha=0$ where ($\alpha$) is the local contrast value, (d) is the difference between the maximum pixel value and the minimum pixel value, and (A) and (B) are constants.

11. A document processing system for converting halftoned image data into continuous toned image data, the system comprising:
    an image input subsystem;
    a processing subsystem for processing halftoned image data provided by the image input subsystem; and
    software/firmware means operative on the processing subsystem for:
    a) low-pass filtering a halftoned input pixel value provided by the image input subsystem to produce a low-pass filtered pixel value;
    b) notch-filtering the halftoned input pixel value to produce a notch-filtered pixel value;
    c) determining a local contrast value for the halftoned input pixel value; and
    d) producing a descreened output pixel value based on the low-pass filtered pixel value, the notch-filtered pixel value, or a combination of the low-pass filtered pixel value and the notch-filtered pixel value depending on the local contrast value.

12. The system of claim 11, wherein c) includes:

e) generating blurred image data from the halftoned image data;

f) determining a difference between a maximum pixel value and a minimum pixel value within a window centered on a blurred image data pixel corresponding to the halftoned input pixel; and g) determining the local contrast value based on the difference between the maximum pixel value and the minimum pixel value.

13. The system of claim 12, wherein the local contrast value is determined from:

IF $d \leq A$, THEN $\alpha=1$

OR IF $A<d<B$, THEN $\alpha=(B-d)/(B-A)$

OR IF $d \geq B$, THEN $\alpha=0$ where ($\alpha$) is the local contrast value, (d) is the difference between the maximum pixel value and the minimum pixel value, and (A) and (B) are constants.

14. The system of claim 13, wherein (A) is about 8 and (B) is about 32.

15. The system of claim 11, wherein d) includes:

e) producing the descreened output pixel value based on the low-pass filtered pixel value when the local contrast value is less than or equal to a first threshold value;

f) producing the descreened output pixel value based on the notch-filtered pixel value when the local contrast value is greater than or equal to a second threshold value; and g) producing the descreened output pixel value based on the combination of the low-pass filtered pixel value and the notch-filtered pixel value when the local contrast value is greater than the first threshold value and less than the second threshold value.

16. The system of claim 15, wherein the first threshold value is about 8 and the second threshold value is about 32.

17. The system of claim 11, wherein the descreened output pixel value is determined from:

$$P_{out}(x,y)=\alpha P_{lpf}(x,y)+(1-\alpha)P_{nf}(x,y)$$

where $P_{out}$ (x,y) is the descreened output pixel value, ($\alpha$) is the local contrast variable, $P_{lpf}$(x,y) is the low-pass filtered pixel value, and $P_{nf}$(x,y) is the notch-filtered pixel value.

18. The system of claim 17, wherein the local contrast variable is in the range of 0 to 1.

19. The system of claim 17, wherein the local contrast variable is determined by:

e) generating blurred image data from the halftoned image data;

f) determining a difference between a maximum pixel value and a minimum pixel value within a window centered on a blurred image data pixel corresponding to the halftoned input pixel; and g) determining the local contrast value based on the difference between the maximum pixel value and the minimum pixel value.

20. The system of claim 17, wherein the local contrast value is determined from:

IF $d \leq A$, THEN $\alpha=1$

OR IF $A<d<B$, THEN $\alpha=(B-d)/(B-A)$

OR IF $d \geq B$, THEN $\alpha=0$ where ($\alpha$) is the local contrast value, (d) is the difference between the maximum pixel value and the minimum pixel value, and (A) and (B) are constants.

21. The system of claim 11, wherein the document processing system is a xerographic document processing system.

* * * * *